Aug. 1, 1939. F. T. O'GRADY 2,168,041
COLOR MOTION PICTURE PROJECTION
Filed Oct. 15, 1937
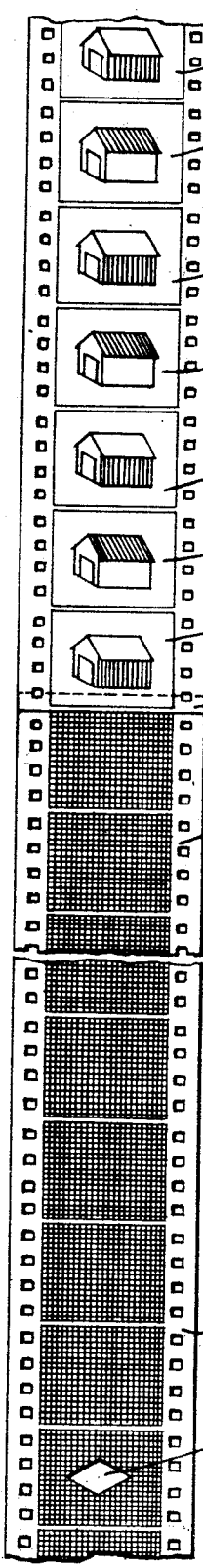
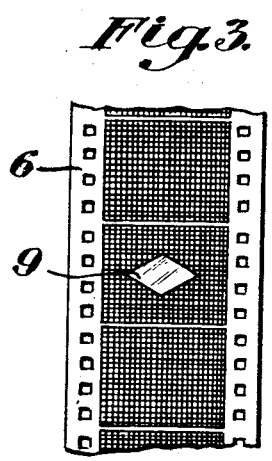
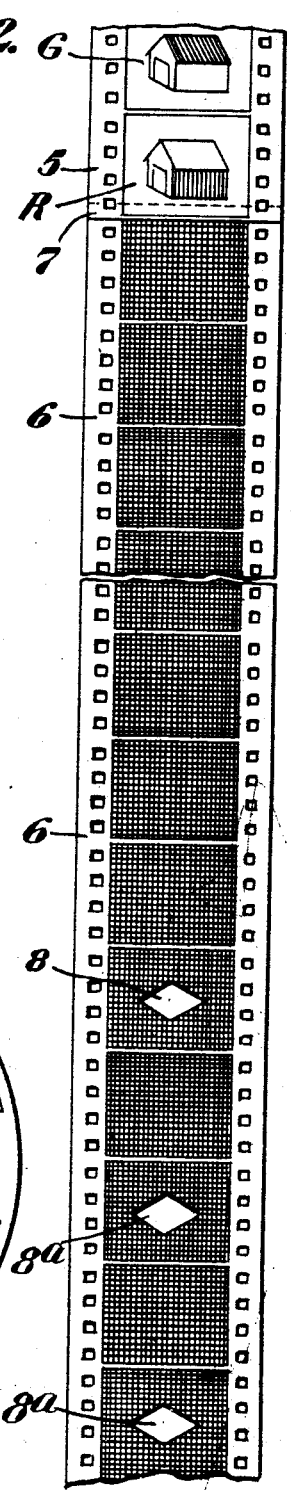
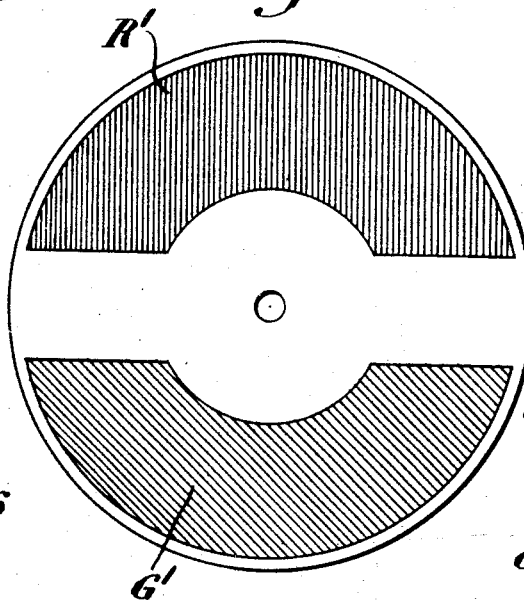
INVENTOR
FREDERICK T. O'GRADY
BY
Davis & Davis
ATTORNEYS Patented Aug. 1, 1939

2,168,041

UNITED STATES PATENT OFFICE 2,168,041

COLOR MOTION PICTURE PROJECTION

Frederick T. O'Grady, Flushing, N. Y.

Application October 15, 1937, Serial No. 169,150

3 Claims. (Cl. 88—16.4)

In several known methods of color motion picture projection there is employed a positive film having a longitudinal series of pictures printed with different color value records in alternation along the series. In one of these methods the pictures are projected one at a time, in rapid succession through different color filters appropriate to the pictures projected. By persistence of vision several of the pictures having the different color records, when so projected, give the illusion upon the viewing screen of a single picture having the different colors. Such a method is disclosed in my U. S. Patent No. 1,607,593. In another of said methods several pictures containing the different color records are projected simultaneously through respectively appropriate color filters and are directed to superimpose them in optical register with each other upon the viewing screen, to make a single picture having the different colors. My U. S. Patent No. 1,579,024 discloses such a method.

Both of said methods employ a rotary screen bearing the color filters, and the rotations of the screen must be adjusted with reference to the projection of the the pictures with different color records so that each color record will be projected through the appropriate filter. That is, for example, a picture bearing a red color record must be projected through a red filter, and a picture bearing a green color record must be projected through a green filter. Mechanism for so synchronizing the color filters with the projection of the pictures is disclosed in my U. S. Patent No. 1,623,435.

Heretofore the adjustments of the color screen rotations, when necessary for said synchronization, have been made after commencement of picture projection. As a result, until the adjustment has been made, the projected image upon the viewing screen appears in false colors. This is very annoying to an observer.

Important objects of the present invention are to provide means to indicate to the operator of a projection machine, in advance of picture projection, whether or not adjustment is required in order to properly synchronize the color filters with the picture projections; to provide very simple, inexpensive and satisfactory means for said purpose; and to embody said means in a "leader" film or blank film section attached to the leading end of the picture-bearing film.

In the drawing,

Fig. 1 is a face view of a portion of a positive motion picture film and a portion of an attached leader film section embodying the invention;

Fig. 2 is a view similar to Fig. 1 showing the leader film section provided with a plurality of light projection apertures;

Fig. 3 is a face view of a portion of the leader film section with a light projection aperture formed by a transparent area of the film; and Fig. 4 is a face view of a rotary color filter disk employed in color motion picture projection.

The reference character 5 designates a portion of a motion picture positive film of a type employed for color motion picture projection in accordance with the aforesaid methods. The film bears a longitudinal series of pictures having records of different colors or color values printed thereon in alternation along the series. In the present instance there are records of the colors red and green. While the pictures are represented in the drawing as shaded for these colors the colors do not actually occur upon the film but merely records of the colors or color values. The pictures bearing the red color records are designated R. Those bearing the green records are designated G and they alternate with the "R" pictures along the film. Assuming that the object photographed, by practice of a well known method of color motion picture photography, was a building with red sides and a green roof, and the pictures R and G are prints from the exposures, each picture R will have a record of red color or color value on the portion of its image representing the sides of the building while each picture G will have a record of green color or color value upon the roof portion of its image. In projection it is necessary that each picture R be projected through the red color filter R' of the rotary screen shown in Fig. 4, and that each picture G be projected through the green color filter G' of the screen.

For the purpose of starting a reel of motion picture film through a projection machine, the film is usually provided with a blank strip of film 6 having a series of black or opaque areas corresponding in size, shape and spacing with the picture areas or "frames" on the film 5. This film strip is called a "leader" film. It is joined, as at 7, to the leading end of the film 5 and has sprocket holes continuing the series of sprocket holes in the picture 5. The length of the leader film or film section 6 is sufficient to permit the projection machine to attain its proper speed before the projection of the pictures upon the viewing screen commences. My invention embodies in the "leader" film means to indicate to the operator of the projection machine whether or not correction in the timing of the color filters is required in order to properly synchronize the filters with the picture projections.

At a point materially spaced from the leading end of the picture film 5 the leader film 6 is provided with a light-projection aperture 8 located in one of the opaque areas and of liberal size with reference to said area. Preferably said aperture is spaced along the leader film several feet, say approximately three feet, from the first picture on the film 5. This distance is sufficient to include approximately forty-eight picture spaces. The aperture may be formed by cutting or punching out a portion of the leader film, as shown in Fig. 1, or by leaving a portion of one of the opaque areas transparent, as shown at 9 in Fig. 3. In the claims the word "aperture" is meant to include both forms. The purpose of the aperture is to enable projection of a flash of light through one of the color filters and upon the viewing screen before picture projection commences so that the operator will know by the color of the flash whether or not the color filters will synchronize properly with the projected pictures.

If a red flash is chosen as a signal to indicate that the filters will synchronize properly with the pictures the aperture should be spaced an even number of picture spaces from the first picture on the film 5 having a red color record. If then a red flash is projected upon the viewing screen as the leader film is advanced through the projector it is indication to the operator that the color filters are timed for correct synchronization. If a green signal is flashed it is a warning that the timing of the filters requires correction for synchronization. Since the light-projection aperture is spaced many picture spaces from the first picture on the film 5 there is ample time for correction before picture projection commences. Of course a green signal flash may be chosen instead of a red one to indicate correct synchronization. In that case the light-projection aperture on the leader film should be located an even number of picture spaces from the first picture G upon the film bearing a green color record. A red flash would then indicate the need for correction in the timing of the filters.

In order to make sure that the operator will notice the signal flashes the leading film section 6 may, as shown in Fig. 2, be provided with additional apertures 8ª spaced an even number of picture spaces from each other and from the leading aperture 8. This will cause repetition of the signal flashes upon the viewing screen.

What I claim is:

1. A motion picture film for color projection having a longitudinal series of pictures provided with records of different colors in alternation along the series, and a leader film section borne by said film and extending from the leading end thereof, characterized in that said leader film section has an aperture for passage of projection light to the viewing screen, said aperture is spaced along the leader section from the leading picture of the series a predetermined number of picture spaces, and the picture spaces on the leader section between said aperture and the leading picture of said series are light-obstructive, for projection of light through said aperture and through one of several mechanically shifted color filters alternately disposable across the projection light flux, to determine by the color of the consequent light flash upon the viewing screen prior to projection of the pictures whether or not said filters will synchronize appropriately with the projection of the pictures having different color records.

2. A motion picture film for color projection including a leader section and a following picture-bearing section with a longitudinal series of pictures provided with records of different colors in alternation along the series for projection of each picture through a color filter appropriate to the color record on the picture, characterized in that said leader film section has an aperture for passage of projection light to the viewing screen, said aperture is spaced a predetermined distance including a multitude of picture spaces along the leader section from the leading picture of said series, and the intervening picture spaces on the leader section between said aperture and the first picture of said series are light-obstructive, for projection of light through said aperture and through one of several mechanically shiftable color filters alternately disposable across the projection light flux, to indicate by the color of the consequent light flash upon the screen whether or not said filters will synchronize appropriately with the projection of the pictures having different color records, so that the operator may regulate the filter, if necessary, in advance of picture projection during the period of time afforded by the advance of the multitude of said light-obstructive spaces across the light flux.

3. A motion picture film according to claim 2, characterized in that the said aperture is spaced from a selected picture of said series a number of picture spaces which is a multiple of the total number of the said different colors recorded in said series for the purpose set forth.

FREDERICK T. O'GRADY.